HOLCROFT & SMITH.
Car-Track Clearer.
No. 40,410. Patented Oct. 27, 1863.
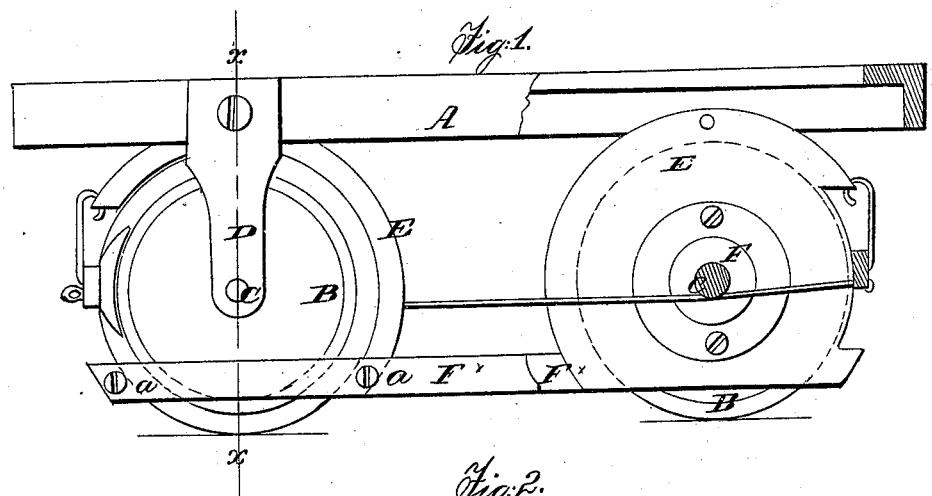
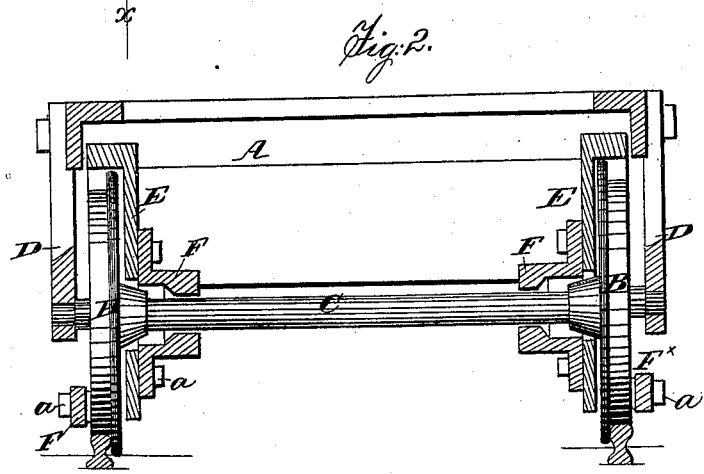

UNITED STATES PATENT OFFICE.

HENRY HOLCROFT AND C. S. SMITH, OF CHESTER VALLEY, PENNSYLVANIA.

IMPROVEMENT IN SAFETY ATTACHMENTS TO RAILROAD-CAR TRUCKS.

Specification forming part of Letters Patent No. 40,410, dated October 27, 1863.

*To all whom it may concern:*

Be it known that we, H. HOLCROFT and C. S. SMITH, of Chester Valley, in the county of Chester and State of Pennsylvania, have invented a new and useful Safety Attachment for Railroad-Car Trucks; and we do hereby declare that the following is a full, clear, and exact description of the same, reference being had to the accompanying drawings, making a part of this specification, in which—

Figure 1 is a side elevation, partly in section, of a car-truck having our invention applied to it; Fig. 2, a transverse vertical section of the same, taken in the line $x\ x$, Fig. 1.

Similar letters of reference indicate corresponding parts in the two figures.

This invention relates to a new and useful attachment for railroad car trucks for preventing accidents in case of the breaking of an axle.

The invention consists in the application of boxes to the truck so arranged as to partially inclose the wheels and to sustain the parts of a broken axle, as hereinafter fully set forth.

To enable those skilled in the art to fully understand and construct our invention, we will proceed to describe it.

A represents the truck of a railroad-car, which may be constructed in the usual or in any proper manner. B represents the wheels, and C the axles, the bearings of which are in pedestals D, attached to the sides of the truck.

E represents shells or cases, which are attached to the truck A, and inclose the inner sides of the wheels B and the upper parts of the same, the outer sides of the wheels being exposed. The inner sides of the shells or cases E have boxes F attached to them, through which the axles C pass, as shown clearly in Fig. 2. To the outer sides of the shells or cases E, at their lower ends, there are attached, by bolts $a$, horizontal bars $F^x$, said bars connecting the two shells or cases at each side of the truck and serving to hold them firmly in position.

The shells or cases E may be of cast iron, and should be firmly attached to the truck, and of such dimensions as not to interfere with the free rotation of the wheels B.

From the above description it will be seen that in the event of the breaking of an axle, C, the parts of the latter will be retained or held by the boxes F and the wheels B kept on the track, the shells or cases E serving to hold the wheels so as not to subject the boxes F to an undue strain.

The arrangement is extremely simple, and will effectually prevent accidents which have hitherto been caused by the breaking of axles, as the wheels in the latter case will be retained on the track a considerable length of time after the fracture, so as to allow ample time to stop the train.

Having thus described our invention, what we claim as new, and desire to secure by Letters Patent, is—

The employment or use of the shells or cases E, attached to the truck A, and provided with the boxes F, and arranged in relation with the wheels B and axles C to operate as and for the purpose herein set forth.

HENRY HOLCROFT.
C. S. SMITH.

Witnesses:
WILLIAM A. MINSHOLE,
EDMUND SISLER.